Dec. 3, 1968  H. B. F. JENSEN  3,414,884
ELECTRONIC PROCESS CONTROL DEVICES
Filed Dec. 20, 1965  10 Sheets-Sheet 1
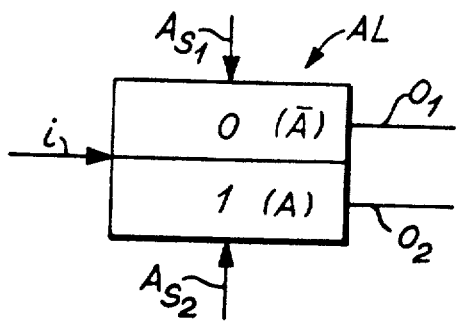
Fig. 1.
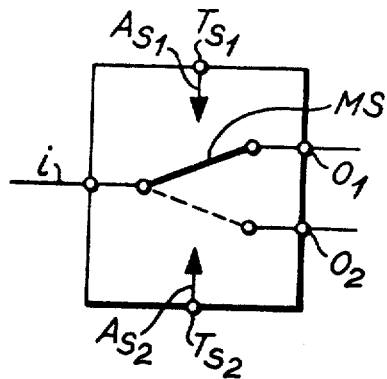
Fig. 2.
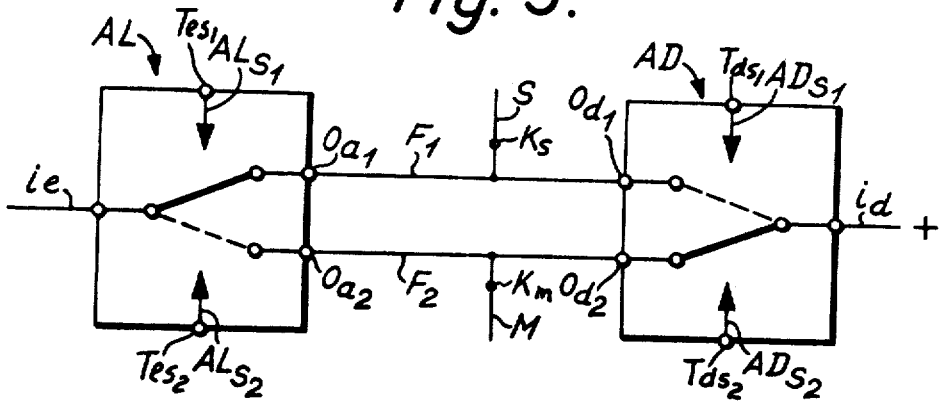
Fig. 3.
Fig. 4.
| A | B | E | S | M |
|---|---|---|---|---|
| 1 | 1 | 1 | 0 | 0 |
| 1 | 0 | 0 | 0 | 1 |
| 0 | 1 | 0 | 1 | 0 |
| 0 | 0 | 1 | 0 | 0 |
INVENTOR
HERMANN BØRGE FUNCK JENSEN
BY Dicke & Craig
ATTORNEYS Fig. 5.
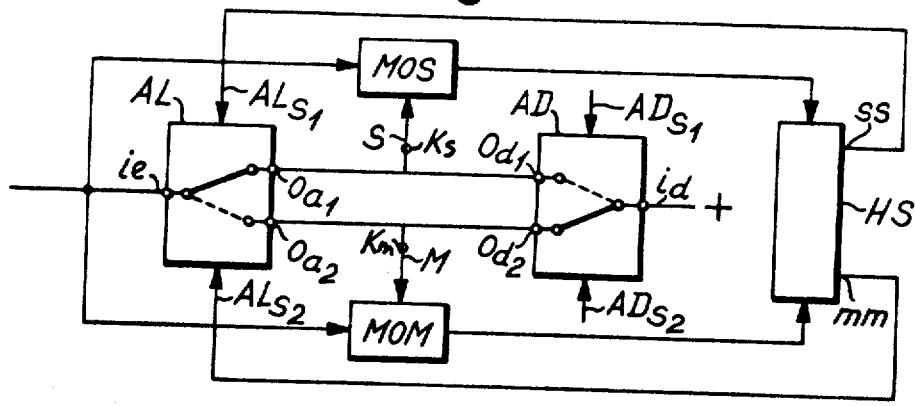
Fig. 6.
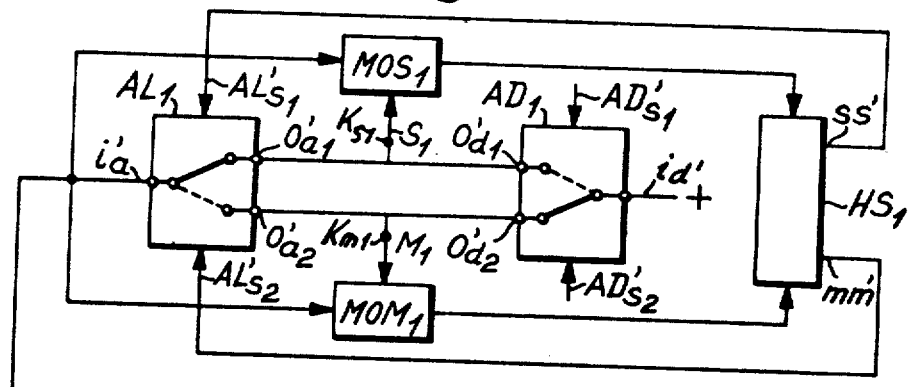
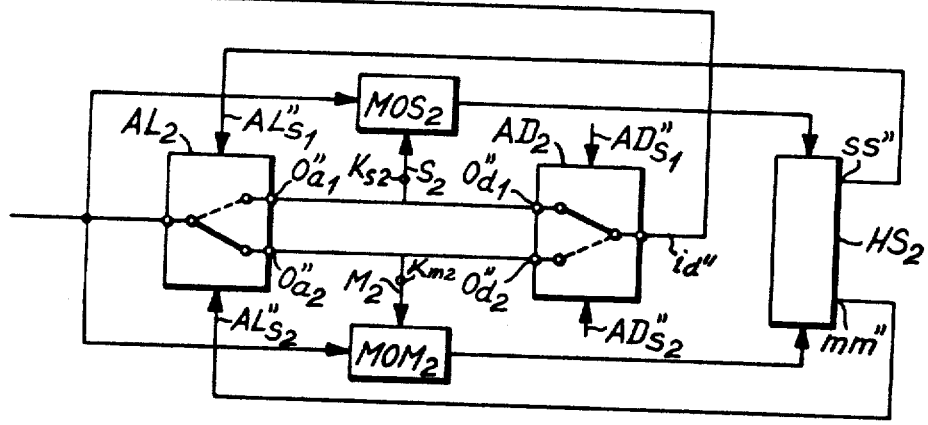
HERMANN BØRGE FUNCK JENSEN Dec. 3, 1968   H. B. F. JENSEN   3,414,884
ELECTRONIC PROCESS CONTROL DEVICES
Filed Dec. 20, 1965   10 Sheets-Sheet 3
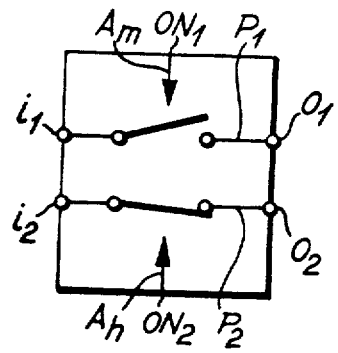
Fig. 7.
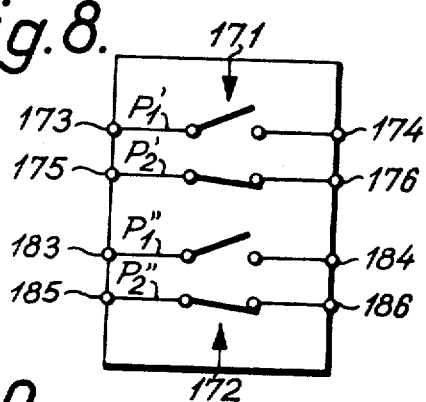
Fig. 8.
Fig. 9.
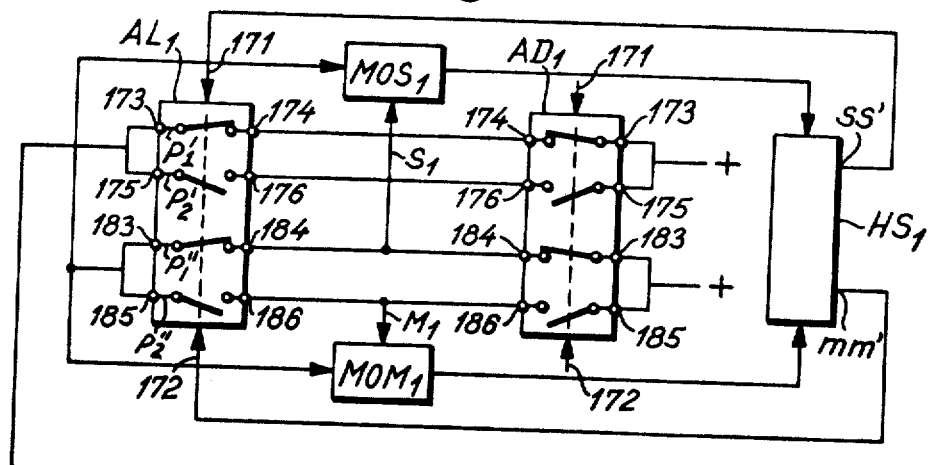
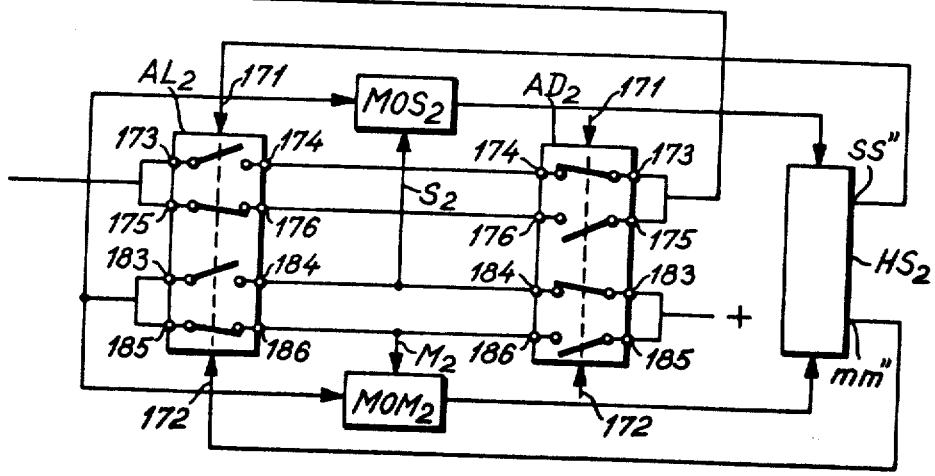
HERMANN BØRGE FUNCK JENSEN
BY
Dicker + Craig
ATTORNEYS Dec. 3, 1968  H. B. F. JENSEN  3,414,884
ELECTRONIC PROCESS CONTROL DEVICES
Filed Dec. 20, 1965  10 Sheets-Sheet 4

INVENTOR
HERMANN BØRGE FUNCK JENSEN
BY
Dicke & Ling
ATTORNEYS

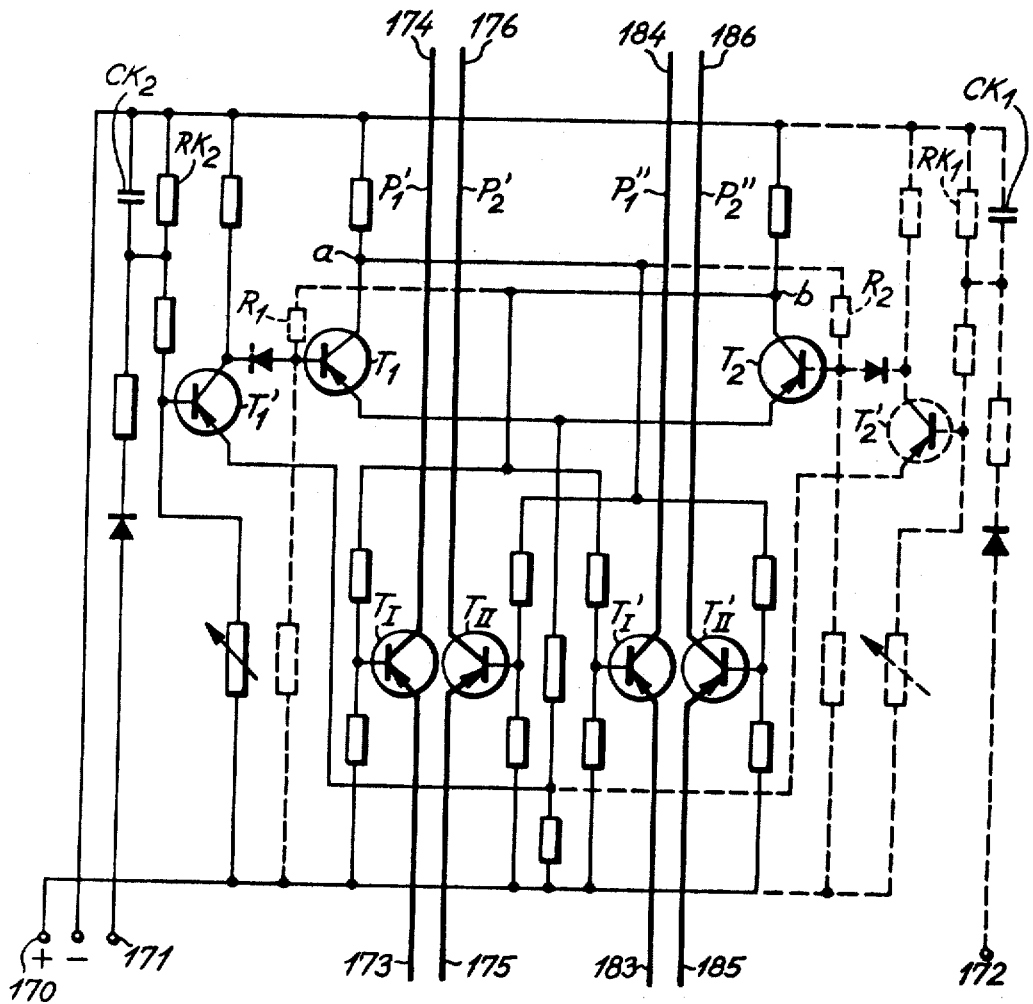

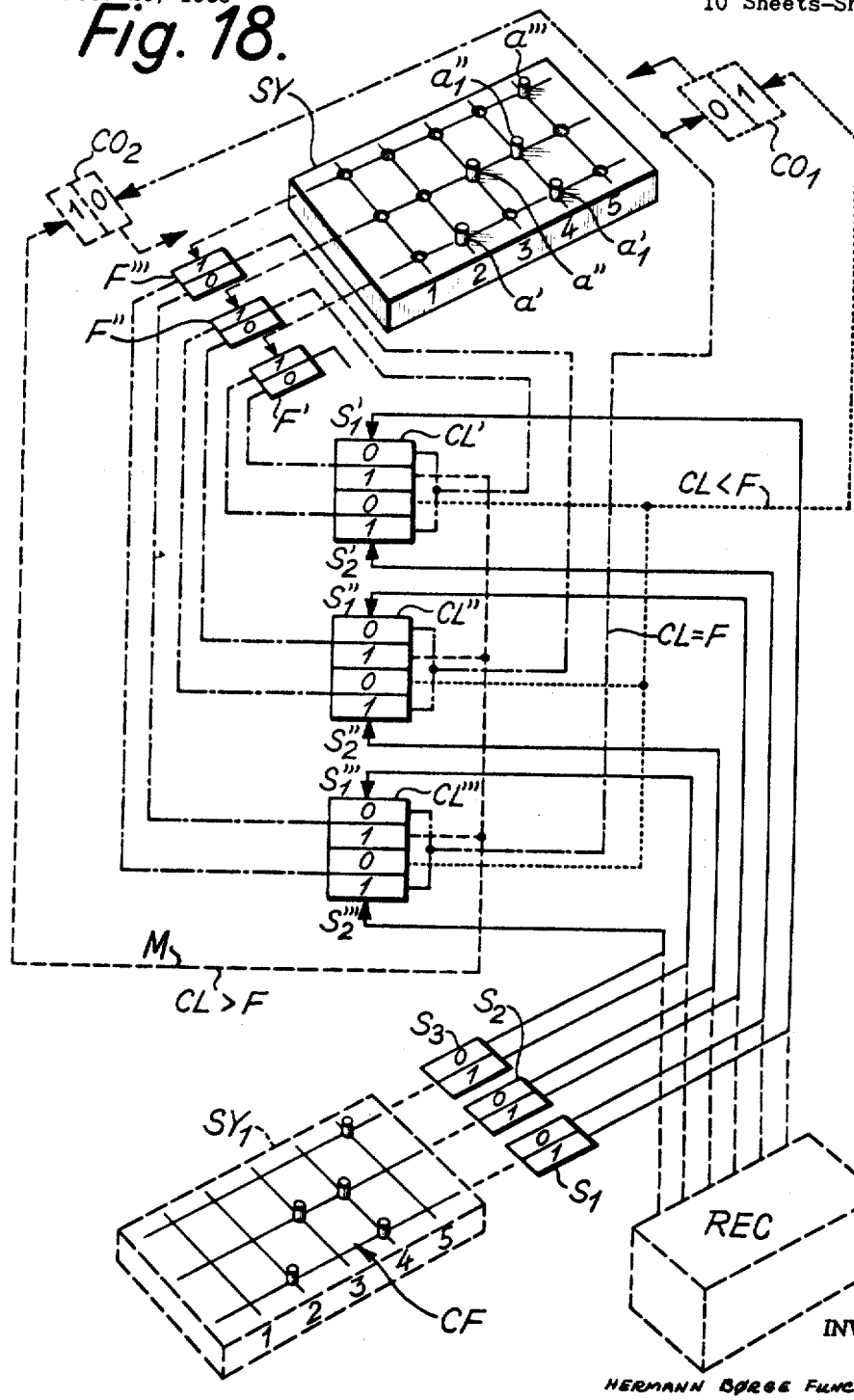

INVENTOR
HERMANN BØRGE FUNCK JENSEN

BY
ATTORNEYS

United States Patent Office 3,414,884
Patented Dec. 3, 1968

3,414,884
ELECTRONIC PROCESS CONTROL DEVICES
Hermann Børge Funck Jensen, 16 Moller Meyersvej,
Arhus, Denmark
Filed Dec. 20, 1965, Ser. No. 515,117
Claims priority, application Great Britain, Dec. 21, 1964,
51,855/64; Dec. 24, 1964, 52,431/64
29 Claims. (Cl. 340—172.5)

ABSTRACT OF THE DISCLOSURE

The invention relates to a logical element which, in addition to terminals for applying a set and a reset signal, has exterior terminals for providing direct passageways through the element; the invention also relates to logic designs formed by series connections of such logic elements whereby not only differences of numerical values can be recognized, but it is rendered possible to obtain a signal to the effect whether one numerical value is higher or lower than another numerical value and thereby to control a movement of a part from one position to a desired position in the correct direction depending on the difference of numerical values of the two positions.

Figure 10:
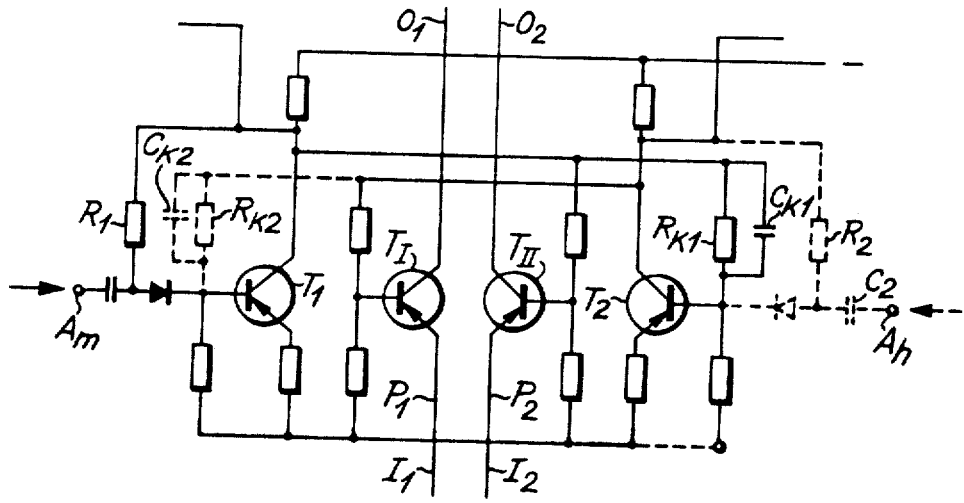

The present invention relates to electronic process control devices or logic elements.

The term "process control" as used here and in the following shall be interpreted in its broadest possible manner to comprise everything from completely automatic control of a complex system with a plurality of functions or operations down to the automatic control of a simple movement of one part of a machine or in a plant.

Different control systems are available as commercial items. The present development of data processing with breakdown of any information available into portions each of which can be expressed only with the figures ZERO and ONE in order to enable the information to be fed into digital type data processing machines has also resulted in a similar breakdown of processes for the purpose of automatic control as well as a corresponding breakdown of the data derived from such processes as they proceed.

The similarity between data processing and automatic control has also led to the use of building blocks frequently referred to as "logic elements" which originally were developed for use in data processing in automation systems.

These logic elements which also are known as "GATES" are commercially available in different types which according to their functions are known as AND-GATES, OR-GATES or NOR-GATES. A "NOT"-function is obtained by means of an inverted AND-GATE. In addition, flip-flops are available. Bistable flip-flops can be used as memories and a plurality of flip-flops can be connected as counters.

In more sophisticated control systems for processing the machine data in the form of discrete values in such a manner that each counter stage is assigned to a process stage, the commands to the machine functions are derived from the counter. This type of systems is normally referred to as sequence control systems.

In still more sophisticated systems which usually are referred to as numerical control systems digital information about the programme is fed into the system mostly from tape by means of a tape reader. The information is stored in a register. The machine data corresponding to the progress of the process is fed into a register for machine data which through a comparison network is connected with the command data. The signals derived from the comparison are through a control unit used to control the process.

Logic elements are mostly used for minor jobs where no change of programme is necessary. Sequence control is normally used for minor and medium size jobs where change of programme is necessary, while numerical control mostly is used for large and complex jobs.

It is a general purpose of the invention to provide a development of electronic control which is applicable to all three kinds of control systems hereinbefore briefly described.

It is a further purpose of the invention to provide a simplification of numerical control which also will render numerical control economical for minor or medium sized jobs.

It is still a further purpose of the invention to provide an electronic control which will render numerical control more sophisticated.

Still a further purpose of the invention is to provide an electronic control which will simplify logic control and also under circumstances will render logical control applicable to jobs where, with the present technique, a more sophisticated control would be necessary.

With these purposes in mind I provide a novel type of logical elements which can be used as a standard building block and in combination with similar logic elements in logic circuits which in the following will be referred to as "LOGIC DESIGN" enables the construction of more sophisticated and more versatile logic designs.

The invention further provides a novel logic design which in greatly simplified manner provides for comparison between data which represent a desired condition of a process and data derived from the process as it proceeds.

The invention further provides for using such logic comparison design as an automatic control means by using the comparison signals directly as command signals.

Figure 12:
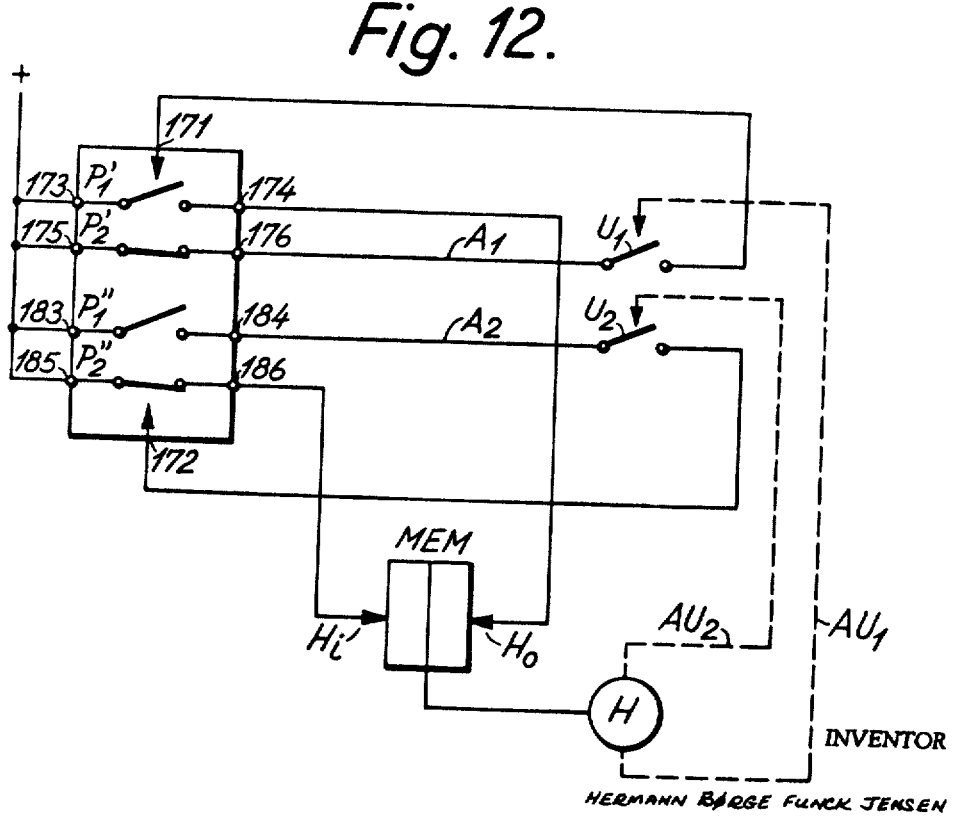
Figure 13:
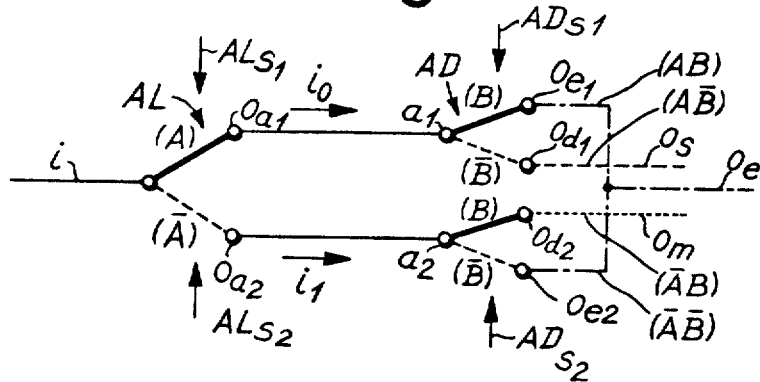
Figure 14:
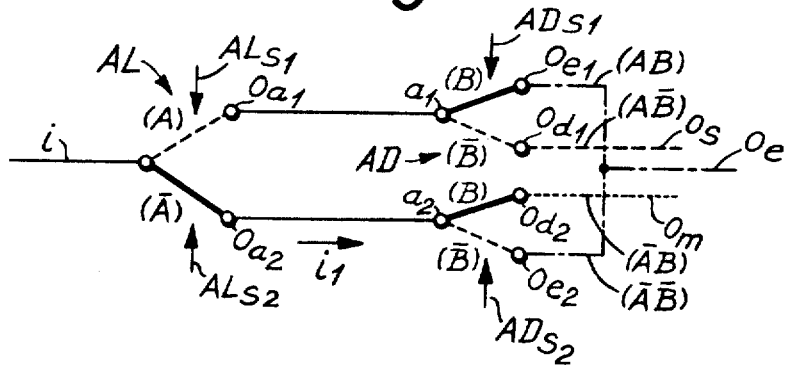
Figure 15:
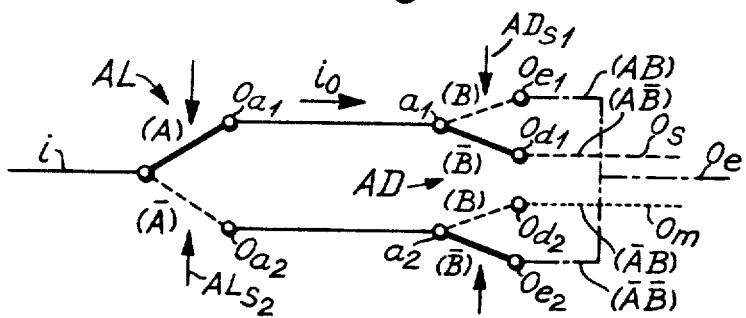
Figure 16:
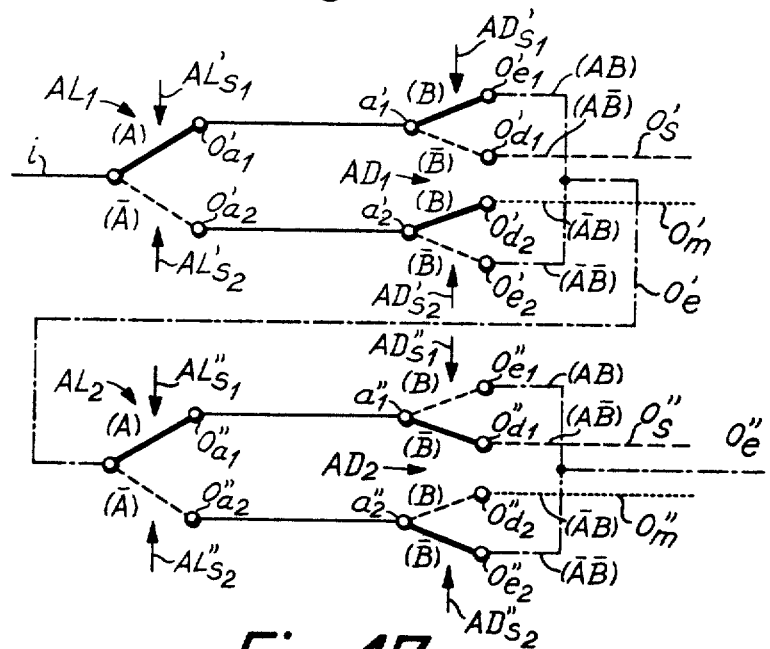
Figure 17:
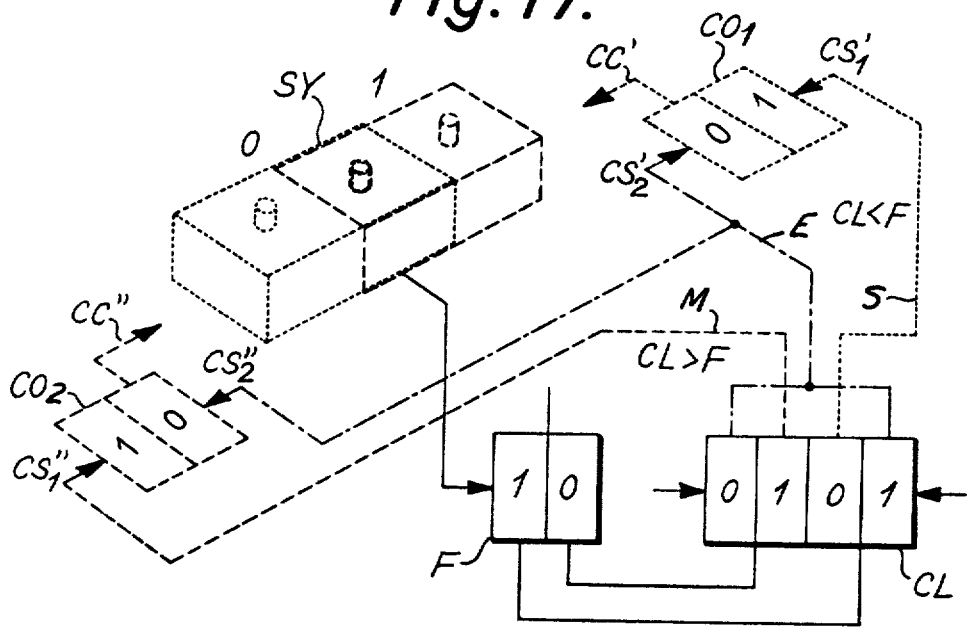
Figure 20:
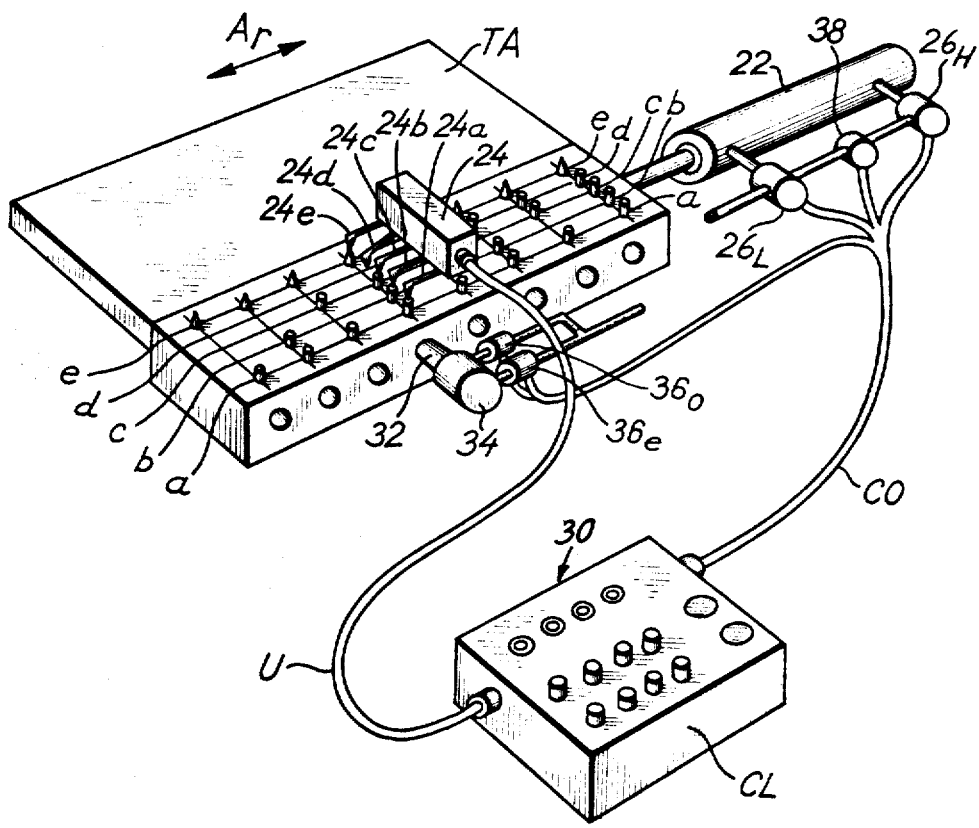
Figure 19:
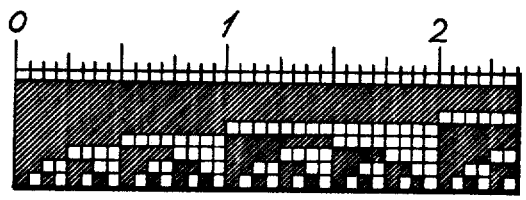
Figure 21:
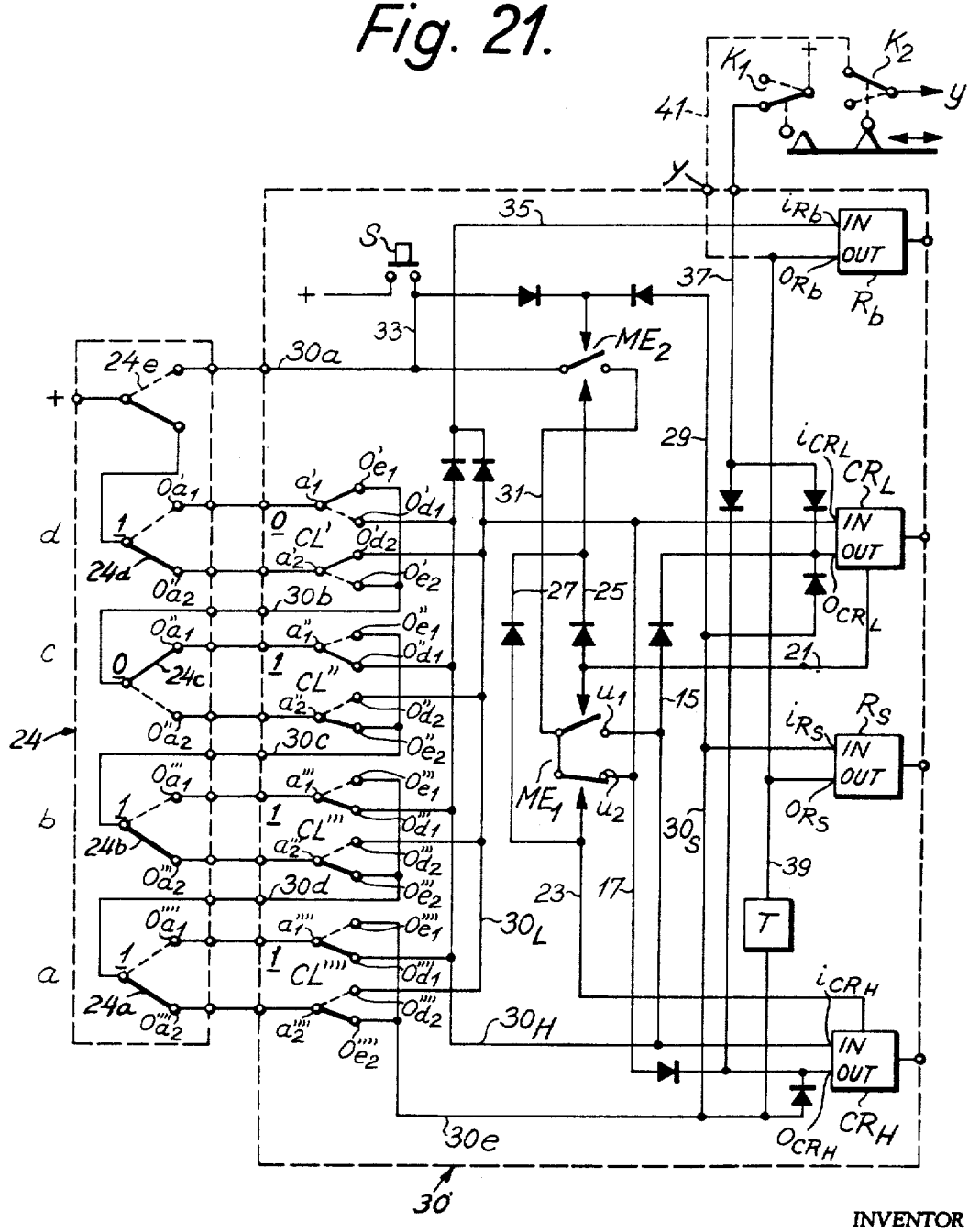

The invention will be further described in the following with reference to the accompanying drawing, in which FIGURE 1 is a logic symbol of an element according to the invention, FIGURE 2 is a corresponding diagrammatic illustration, FIGURE 3 is a diagrammatic illustration of a simple logic design with two logic elements according to the invention, FIGURE 4 is a true table illustrating the various conditions of the logic design of FIGURE 3, FIGURE 5 is a diagrammatic illustration of a simple control using a logic design of FIGURE 3, FIGURE 6 is a control in similarity with FIGURE 5, but with two logic designs according to the invention, FIGURE 7 is a diagrammatic illustration of a further embodiment of a logic element according to the invention, FIGURE 8 is a diagrammatic illustration of a further embodiment of a logic element according to the FIGURE 9 is a diagrammatic illustration of a control similar to FIGURE 6 with logic elements of FIGURE 8, FIGURE 10 is a simplified diagrammatic illustration of the electronic circuits in the element of FIGURE 7, FIGURE 11 is a diagrammatic illustration of the elements of FIGURE 8, FIGURE 12 is a simple diagrammatic illustration showing the element of FIGURE 8 used to provide a simple sequence control, FIGURES 13, 14 and 15 are logic designs according to the invention with elements of FIGURES 2 and 7 respectively illustrating the manner in which such logic design operates as a comparison network to provide three different signals, FIGURE 16 is a series connection of two logic designs according to FIGURE 13, FIGURE 17 is a simplified illustration of an automatic control by means of a logic design according to FIGURE 13, FIGURE 18 is a schematic illustration of a more complicated automatic control with logic designs according to FIGURE 16, FIGURE 19 is an illustration of a binary ruler for use in connection with logic design and arrangements according to the invention, FIGURE 20 is a schematic perspective view of a control arrangement embodying the invention, and FIGURE 21 is a more detailed diagrammatic illustration of an automatic control with the arrangement of FIGURE 20 and using the logic designs of FIGURE 18.

FIGURES 1 and 2 illustrate the logic symbol and the diagrammatic illustration of a simple logic element according to the invention.

In broad terms, the element generally designated by AL is of the on-off type having "set"-means and "reset"-means $As_1$ and $As_2$, respectively for switching the element between conditions to each of which ZERO and ONE, respectively can be assigned. A "set"-terminal $Ts_1$ is operatively connected with the "set"-means $As_1$, and a "reset"-terminal $Ts_2$ is operatively connected with the "reset"-means $As_2$. Means in said logic elements illustrated in the diagram of FIGURE 2 as a switch MS effectively provides on-off type switch means with a first position shown in dotted lines responsive to actuation of the "set"-means, and a second position responsive to the actuation of the "reset"-means shown in full lines. Exterior terminals are provided referred to by $i$ and $o_1$, $o_2$, respectively, operatively connected with said switch means to enable said switch means to be used as a passageway through the logic element in either of its two positions corresponding to the numerical value as determined by the signal on the "set" or "reset" terminal, respectively.

It will be appreciated that with the passageway through the element separated from the "set" and "reset" function, an element of great versatility and with an extended range of applications is obtained. With simultaneous input on the terminals $i$ and $Ts_2$ the element combines such AND-condition with true signal on the output terminal $o_1$ and also includes the inverted AND-function, namely NOT-function, because there is no signal on the output $o_2$.

The element has, however, also a memory function, because in the bistable embodiment of the element it will remain in ZERO or ONE position until a "reset" or "set" signal has been applied. In other words, in addition to the AND or NOT function for simultaneous signals as hereinbefore mentioned the element has what can be referred to as a "memory type AND function," because even if the "set" or "reset" signal has disappeared, and the signal to the terminal $i$ is applied later, the element will still have the AND-function as well as the inverted NOT-function with respect to the conditions that signal is now applied to terminal $i$, and that signal has been applied to one of the "set" or the "reset" terminals previously. This is even combined with the second NOT-function, namely in the event that the AND-function is assigned to the "set" terminal, that "reset"-signal has not yet been applied.

It will be obvious that with all these combined functions in one logic element it is possible to provide logic designs with elements according to the invention as standard elements and without the necessity of using different types of logic elements for each of the desired functions such as AND or NOT, NOR and MEMORIES. In addition, the fact that the memory function is always present in an element according to the invention will obviously in many cases enable logic designs to be constructed with a reduced number of elements compared with present logic designs.

The increased number of functions of the element according to the invention further provides for construction of simple logic designs which can make comparison between a desired condition of a system which is expressed by the setting of one logical element and a present condition of the system which is expressed by setting of another logical element. Such logic design can be constructed to take out signals which are not only indicative of whether the numerical value of the two logical elements is the same or different, but also to indicate whether one of the elements has a lower or higher numerical value than the other one. This again leads to increased aspects in the field of recognizing a state of conditions of a system and opens up novel and simplified aspects in the field of designing control apparatus to change the condition of a system from a measured condition to a desired condition in a simple manner.

FIGURE 3 illustrates a simple logic design with two elements according to the invention, of which one referred to by AD represents a desired condition and the other one referred to by AL represents a measured condition. The various terminals of the two elements are referred to by the same reference numerals as in FIGURES 1 and 2 with the addition of index letters $d$ and $l$ respectively for the elements AD and AL respectively.

The elements are connected by means of two parallel leads $F_1$ and $F_2$, respectively which extend between the "o"-terminals of the two elements. Hereby two different passageways are provided from the terminal $i_d$ to the terminal $i_l$.

The condition of each of the elements is expressed in numerical values. If the desired numerical value is referred to by A, i.e. as represented by the element AD and the measured numerical value of the element AL is referred to by B, the Boolean algebraic expression for the two elements having the same numerical value E is $$E = A \cdot B + \overline{A} \cdot \overline{B}$$

while a measured value higher than desired is expressed by $$S = A \cdot \overline{B}$$

and a measured value lower than desired is expressed by $$M = \overline{A} \cdot B$$

The same result will be found by drawing a true table which will be as shown in FIGURE 4 and from which these Boolean expressions can be verified.

From these expressions compared with FIGURE 3 it will be obvious that with an input signal on $i_d$ the terminal $i_l$ will be output terminal for E-signal because for the condition $A \cdot B$ as well as for the condition $\overline{A} \cdot \overline{B}$ there is a connection the whole way through from the terminal $i_d$ to the terminal $i_l$ through the one or the other of the leads $F_1$ and $F_2$.

Alternatively, in the state illustrated in FIGURE 3 which corresponds to $A \cdot \overline{B}$, there will be signal on the lead $F_2$ which means that M-signal can be derived from a terminal $K_m$ connected with this lead.

In the other position it will be obvious that there will be signal for S on the other lead $F_1$ so that S-signal can be derived from a terminal $K_s$.

This obviously provides for the possibility of changing the condition of the measured numerical value to the condition E by applying a "set"-signal from $K_m$ to $T/s_1$ in the state illustrated in FIGURE 3, or applying a "reset"-signal to the element AL from $K_s$ in the reversed state.

As mentioned hereinbefore, however, the element AL was supposed to be an element indicative of the condition of a member in a system. By way of example the member in question may be a valve in a pipeline of a chemical plant which is supposed to be opened and closed as a part of a complex process control and with which feeler devices are operatively connected to signal the condition of the valve (open or closed) to the element AL as registering or measuring element.

Obviously, in such event the control to be effected is to open or close the valve in response to the setting of the element AD as commanding element, if the logic comparison design of FIGURE 3 gives S or M-signal and to terminate the operation which changes the condition of the valve in response to E-signal.

A simple control arrangement for this purpose is shown in FIGURE 5 where the actuator member for the element of the system to be controlled, for example, the valve, is referred to by HS. The M-signal is applied as "set"-signal to a memory MOM which initiates the operation of HS in the direction of the condition which responds to the higher numerical value. When that condition has been reached, the feeler arrangement associated with HS provides a signal at an output $ss$ which is applied as "set"-signal to the element AL to set this elecent to the higher numerical value. Thereby the logic comparison design of FIGURE 3 which is included in the control system of FIGURE 5 gives an E-signal at the output $i_1$. This output is connected with the "reset"-terminal of the memory MOM whereby the command to HS disappears.

Supposing that at a later stage of the process, for example in response to the completion of mixture of several fluids in a vessel, the state of the commanding element AD is reversed, there will immediately occur an S-signal on terminal $K_s$. This is applied as "set"-signal to a second memory MOS which activates HS until a second feeler device therein at an output $mm$ gives "reset"-signal to the element AL which again will result in an E-signal which also is applied as "reset"-signal to the memory MOS.

The two memories MOM and MOS may be of precisely the same type as the elements AD and AL with that one of the passageways therethrough which is established in response to a "set"-signal used for energizing the activator HS. Obviously, it is thereby possible to construct a combined control from standard elements. The same result may be achieved by using traditional commercially available logic elements but this would require a larger number of elements and in addition elements of different types.

In most cases the desired control is not limited to control of one single operation but requires simultaneous control of some operations with control of other operations in desired sequence. By way of example, it may be desired in a pipeline system to open a plurality of valves simultaneously and close other valves in accordance with a predetermined scheme, for example in order to mix different fluids in a chemical plant.

The control system of FIGURE 5 is also applicable in such case by connecting two or more logic comparison designs of FIGURE 3 in cascade such as shown in FIGURE 6. Here the two first elements in the cascade are referred to by $AL_1$ and $AD_1$ and in the second step of the cascade by $AL_2$ and $AD_2$. The remaining parts of the components are in FIGURE 6 referred to by the same reference numerals as in FIGURE 5. Obviously in operation the cascade of FIGURE 6 first completes the first operation by means of the actuator $HS_1$ and when an E-signal occurs, in addition to being used as "reset"-signal to the activated one of the two memories, this is used as input signal on the input terminal $i''_d$ of this second step of the cascade which thereafter activates the second operation.

In the examples described hereinbefore, only logic elements with one passageway have been described.

A substantial increase of the number of possibilities not only in the construction of logic comparison designs but also in the construction of control arrangements can be obtained by providing the element according to the invention with two or more passageways and especially with passageways which are oppositely conditioned so that one is closed when the other one is open, or pairs of passageways are closed while other pairs are open.

A simple diagrammatic symbol of an element according to the invention with two passageways is shown in FIGURE 7. One passageway which is referred to by $P_1$ has one terminal $i_1$ and another $o_1$. The other passageway which is referred to by $P_2$ has a terminal $i_2$ and another terminal $o_2$. When the element is switched from one condition to the other, the passageway $P_1$ is closed simultaneously with opening of the passageway $P_2$ and vice versa.

A further embodiment of an element according to the invention is shown in FIGURE 8. The "set"-terminals are here referred to by 171 and 172. The element has four passageways of which two are open, namely a passageway $P'_1$ between terminals 173 and 174, and a passageway $P''_1$ between terminals 183 and 184, while two other passageways namely $P'_2$ between terminals 175 and 176 as well as a passageway $P''_2$ between terminals 185 and 186 are closed.

It will be appreciated that by including more than one passageway in an element according to the invention, this is not only a duplication of the function of the passageway because the number of combinations possible is increased with addition of each further exterior terminal added to the element. Just as many other technical designs are compromises between material and labor costs and the degree of sophistication obtained, this also counts for an element according to the invention. I have found, however, that with the number of components necessary for constructing an element, a quadroplex element of FIGURE 8 is a reasonably good compromise because it provides for so many possibilities used as a standard type element that an increased number of components is believed to be justified.

While in FIGURE 6 each portion of the cascade only operates after the preceding portion has completed its operation which may be practical in certain cases but not in other, FIGURE 9 illustrates a similar cascade connection constructed with elements according to FIGURE 8.

All the terminals of the elements of FIGURE 9 are referred to by the same reference numerals as the terminals of FIGURE 8 and the various connections shown in FIGURE 9 also serve to illustrate the versatility with respect to combination possibilities of the element of FIGURE 8.

In the two commanding elements, the terminals 173, 175 and 183, 185 respectively are connected whereby each of the pairs of passageways $P'_1$, $P'_2$, and $P''_1$, $P''_2$, respectively, operate as a simple throw-over switch with alternative output on for example 174 or 176.

In the registering elements of FIGURE 9, the terminals 174, 176 and 184, 186 are connected and thereby represent the equivalence of the terminal $i_1$ of FIGURE 3.

The comparison of the numerical values as well as the control are in FIGURE 9 inserted in the passageways $P''_1$ and $P''_2$ of the elements. The two other pairs of passageways $P'_1$ and $P'_2$ provide the cascade connection. In the second cascade, however, the connection between the commanding element $AD_2$ and the registration element $AL_2$ is inverted so that while there is always a signal through the first cascade to either of the outputs 174 and 176 of the element $AL_1$ and thereby an input signal to the commanding element $AD_2$ of the second part of the cascade, there is only an output signal on the terminals 184, 186 of the element $AL_2$ after completion of a control in the second cascade so that there will only be an output signal available when the two operations have been carried out, for example two valves opened or closed, or one valve opened while the other is closed. On the other hand two operations will be started simultaneously. The output signal from the last part of the cascade is hereby rendered available for other control purposes such as for example to switch on a heating element for a vessel in which two fluids have been mixed, or as another possibility through a timer to reset the two commanding elements to invert the control to close the valves which have been opened after a predetermined time.

FIGURE 10 is a simple diagrammatic illustration of the manner in which an element according to the invention can be constructed. A part of the circuitry is shown in dotted lines. With the dotted lined circuitry included the element is of the bistable type also known as a flip-flop.

As well known in the art such flip-flop circuitry includes two transistors $T_1$ and $T_2$, of which $T_1$ always is closed when $T_2$ is open and vice versa. Due to the mutual feed-back through the elements $CK_1$, $RK_1$, $R_2$ and $CK_2$, $RK_2$ and $R_1$, the element will remain in the state caused by a "set"-signal or a "reset"-signal on one of the inputs $A_m$ or $A_h$ until a signal is applied to the other one of these two inputs.

As shown in FIGURE 10 the passageways through the flip-flop are provided by means of two transistors $T_I$ and $T_{II}$ which are mutually connected with the feed-back circuits from the transistors $T_1$ and $T_2$ obviously in such a manner that when $T_2$ is closed $T_1$ is open, while $T_{II}$ is closed, whereas by application of "reset"-signal the situation is reversed.

FIGURE 11 is a diagrammatic illustration of the manner in which an element according to FIGURE 8 can be constructed. The flip-flop transistors of FIGURE 11 are as in FIGURE 10 referred to by $T_1$ and $T_2$. The "set" and "reset"-terminals are referred to by 171 and 172 and a further terminal 170 is provided for voltage supply.

A transistor $T'_1$ has its collector connected with the base of the transistor $T_1$, and another transistor $T'_2$ has its collector connected with the base of the transistor $T_2$.

With a "set"-signal on the input 171, the transistor $T'_1$ is closed whereby the transistor $T_1$ is open which in its turn closes transistor $T_2$. Hereby the potential on the point $b$ is rendered negative and by way of the connection with the base of the transistors $T_I$ and $T'_I$ in the passageways $P'_1$ and $P''_1$, these two transistors are opened.

At the same time, due to the positive potential at the point $a$, the two transistors $T_{II}$ and $T'_{II}$ in the passageways $P'_2$ and $P''_2$ are closed.

In other words, the state of the passageways is as indicated in FIGURE 8.

With "reset"-signal on the input 172, the situation is reversed. As obvious from the manner in which the switch analogy is drawn, a "set"-signal on the output 171 causes change of the state of the passageways as indicated by the arrow associated with the input 171, while an input signal on the input 172 changes the state of the element in the direction of the arrow associated with the input 172.

In FIGURE 10 as well as in FIGURE 11 one of the mutual feed-back circuits is shown in dotted lines and as will be understood from the foregoing description, the dotted-line portions can be omitted in which event the elements will be monostable elements which automatically will revert to the state shown in FIGURES 7 and 8 respectively in the event that the "set"-signal disappears.

Elements according to the invention can be used in automatic control systems as electronic relays, either of the monostable or the bistable type in the same manner as mechanical relays because the "set" or "reset" input is the equivalent of the input to the relay winding of a mechanical relay and the terminals of the passageways are the equivalents of the terminals of the mechanical contacts of a mechanical relay. Obviously, the number of passageways corresponds to a similar number of mechanical contacts of a mechanical relay.

As will be appreciated from FIGURE 10 and FIGURE 11, the element according to the invention differs from ordinary logic elements in which usually the output is derived from the collector of the flip-flop transistors. By using the flip-flop transistors to control the opening and closing of the transistors through which the passageways are provided, a practically complete galvanic separation between the "set" and "reset" terminals and the passageway terminals is obtained with the result that the danger of false output signals due to leakage currents is practically completely avoided.

Due to the presence of the terminals at both ends of each passageway an output signal is not caused, as in traditional flip-flops, by a "set"-signal but also requires an input signal to the passageway in question which is closed.

As mentioned hereinbefore an element according to the invention also provides for construction of sequence control. A simple system of this kind is indicated in FIGURE 12. The construction of the sequence control is based on using one of the passageways through an element according to the invention to provide an additional AND-function by connecting the passageway in series with a sensing switch of the equipment to be automatically controlled.

In FIGURE 12 $U_1$ and U are supposed to be sensing switches adapted to be actuated to be closed through actuator means $AU_1$ and $AU_2$ which are operatively associated, for example, with a movable machine part H in the one or the other of two positions thereof. The machine part H is operatively connected with a memory MEM in such a manner that it makes a first part of its movement to close the switch $U_1$ when a "set"-signal is applied to the input $H_i$ of the memory and to make the second part of its movement to close the sensing switch $U_2$ when a "reset"-signal is applied to an input $H_o$ of the memory.

In FIGURE 12 starting from the state of the element which is that of FIGURE 8 as shown the output 186 is connected with $H_1$ and the output 174 with $H_0$. The passageway $P'_2$ is connected in series with the sensing switch $U_1$, and the passageway $P''_1$ is connected in series with the sensing switch $U_2$ in lines referred to by $A_1$ and $A_2$ respectively.

Obviously, starting from the state illustrated, the memory MEM is provided with an input signal through the passageway $P''_2$ whereby the movement is started. When through the actuator means $AU_1$ the sensing switch $U_1$ is closed this provides an "AND"-function with the passageway $P'_2$ whereby a "set"-signal is applied to the input 171 which reverses the state of the element.

This closes the passageway $P'_1$ which provides "reset"-signal to the input $H_0$ of the memory and at the same time it opens the sensing line $A_1$ but closes the passageway $P''_1$ to condition the second sensing line $A_2$ for AND-function when the reverse movement of the machine element H through the actuator means $AU_2$ closes the sensing switch $U_2$. This AND-function provides a "reset"-signal to the terminal 172 of the element whereby the situation is brought back to the initial stage and the whole function can be repeated.

Obviously, a simple arrangement like the one here described can be used for continuously moving a machine part back and forth between two positions in each of which the corresponding sensing switch is actuated.

If desired, to retain the machine member in one of the exterior positions for a predetermined period, a time delay element can be included in series with one of the lines to the corresponding one of the inputs of the memory MEM.

The machine element may for example be the drill of a drilling machine which continuously is moved up and down and, if desired, kept in the top position for a predetermined period to enable a new workpiece to be brought into position and clamped by means independent of this primitive automatic control.

As will be obvious to those skilled in the art, however, a similar element may be provided for the transport of the workpiece to the desired position, and another element may be used for effectuating the clamping.

This leads to using elements according to the invention in complete automatic sequence control systems, because for example in the case of a drilling machine, it will be possible to connect the three elements which control each of the three functions in such a manner that they are switched from one state to the other in desired sequence and with the sensing lines which are connected with the individual sensing devices rendered operative to provide for the necessary coincidence of a closed passageway of an element and the operation of the corresponding sensing switch in the line in question.

With the simple controls described hereinbefore using simple elements with only one passageway, it is in practice only possible to control functions between off and on conditions such as to close or open a valve.

More sophisticated controls can, however, be obtained by connecting a duplex element according to the invention in series with a simple switch. Such a duplex element may for example be provided by means of a switch according to FIGURE 7 in which the terminals 173, 175 are connected and the terminals 183, 185 are connected.

By such series connection logic designs as shown in FIGURES 13, 14 and 15 are provided. In these figures the duplex switches are referred to by AD and represent the commanding logic element, while the simplex switch AL represents the registrating logic element.

As obvious from FIGURE 13 which illustrates both elements AL and AD being in the ZERO-position, the ZERO-signal from the element AL provides a ZERO-signal on the output $o_{e1}$ of the element AD. On the other hand, if both elements are in the ONE-position, the ONE-signal from the element AL will obviously result in output on $o_{e2}$. These two outputs therefore obviously represent outputs for equal numerical value of the two elements and can be connected together to a single output $o_e$ in which the index $e$ stands for "equal."

IN FIGURE 14 the element AL is shown in the ONE-position. Obviously on this case there is ONE-signal $i_1$ on the input $a_2$ with output signal only on $o_m$ of the element CL. Since in FIGURE 14 the numerical value AD is smaller than the numerical value of AL, the output $o_m$ can be referred to as the output for $F>CL$ or $CL<F$.

In a similar manner it is obvious from FIGURE 15 that with AL in ZERO-position and AD in ONE-position there will only be an output signal on $o_s$ which can be designated as the output for $F<CL$.

The same logic algebra applies to the logic design of FIGURES 13, 14 and 15 as that which applies to FIGURE 3.

In similarity with the embodiment of FIGURE 3, also the logic design of FIGURES 13–15 can be connected in cascade as shown in FIGURE 16.

As obvious from FIGURE 16 with reference to the explanation given hereinbefore the ZERO-position of the two simplex on-off-elements F' and F'' with a ZERO-position of the first duplex element CL' and a ONE-position of the second duplex element VL'' results in output on the line $o''_8$ for $F<CL$.

The logic designs of FIGURES 13–16 are useful as a control device in connection with further logical elements as indicated in FIGURE 17.

In the simplified arrangement of FIGURE 6 which is illustrated only to render the control possibilities understandable more easily, SY symbolizes a system having a ZERO-condition and a ONE-condition and being illustrated as a body movable between two positions. A connection is provided between the element AL and the system SY operable to set the element AL to the ZERO,- ONE position or ONE-ZERO position corresponding to the ZERO or ONE condition of the system SY.

Exterior means are provided to set the element AD to a desired one of the positions ZERO or ONE.

Obviously, if the system is in the ZERO-position, the element AL will be in the ZERO-position.

If the element AD is set to the ZERO-position, there will be output signal on the line for EQUAL.

If the setting of the duplex element AD is an expression for the desire of the position into which the system should be moved if its position or condition deviates from the numerical value of the duplex element AD, there will obviously be an output on the line for $AD<AL$ if the system is in condition ONE, while the duplex element is set to condition ZERO. Alternatively, if the system is in condition ZERO and the duplex element is set to condition ONE, there will be output on the line for $AD>AL$.

In the automatic control of change of the condition of the system this can be utilized by providing a pair of further logical elements $CO_1$ and $CO_2$ of which the element $CO_1$ has a switch-over or set input $cs'_1$ which is connected with the line for $AD>AL$. In a similar manner the element $CO_2$ has a switchover or set input $cs''_1$ which is connected with the line for $AD>AL$.

In response to signal on the input $cs'$ the element $CO_1$ is shifted to energize an output $cc'$ which is operatively connected with the system to change its condition from the lower to the higher numerical value corresponding to the signal that the numerical value of the duplex element, which expressed the desire of the numerical value to which the condition of the system should be changed, was the higher value.

Alternatively, if the system is in the ONE-condition and the desire is expressed by setting the duplex element AD to ZERO-condition that the condition of the system should be changed to ZERO, this causes a signal on the lone for $AD<AL$ and thereby an input on the other control element $CO_2$ whereby its output $cc''$ is rendered effective to move the system to the other one of the desired numerical values.

In both cases the control elements $CO_1$ and $CO_2$ are provided with reset inputs $cs'_2$ and $cs''_1$, both of which are connected with the common output from the duplex element corresponding to $AD=AL=SY$.

Thereby, after completion of the change of the condition of the system SY in accordance with the setting of the duplex element a reset signal is provided to both the control elements $CO_1$ and $CO_2$ with the result that the effective control output of that one of the control elements which has been effective during the changing of the condition of the system is rendered ineffective.

As will be appreciated from the foregoing description the change of a system can be controlled in the manner hereinbefore described between a plurality of conditions, the difference between which can be measured.

While the system of FIGURE 17 for the sake of simplicity and explanation is shown with two positions only, a similar system SY having five positions is illustrated in FIGURE 18. The system is still illustrated in the form of a body movable between five different positions and is provided with actuator members for setting three different elements of the on-off type referred to by F', F'' and F''' in such a manner that in position "1" all the three elements are in ZERO-position. In position "2" an actuator member $a'$ switches the elements F' to ONE-position.

In position "3" an actautor member $a''$ switches the element F″ to position ONE. In postion "4" two actuator members a′₁ and a″₁ switch the actuator members F′ and F″ to ONE-position and in position "5" an actuator member a‴ switches the element F‴ to position ONE.

Obviously this corresponds to the following binary coding of the five positions:

```
1 ---------------------------------------- 000
2 ---------------------------------------- 100
3 ---------------------------------------- 101
4 ---------------------------------------- 110
5 ---------------------------------------- 001
```

The on-off type elements F′, F″ and F‴ are connected in cascade in the manner illustrated in FIGURE 5 with duplex elements CL′, CL″ and CL‴, each being adapted to be set to correspond to a binary code representing a desired one of the five positions of the system SY.

Each of the duplex elements has the same three outputs as described hereinbefore, namely an output for equal numerical value of the simplex element, an output for lower numerical value of the simplex element than that of the duplex element and an output for higher numerical value of the duplex element than that of the simplex element.

The output for equal numerical value of the duplex element CL′ is connected with the input of the simplex element F″, and the output of the duplex element CL″ is connected with the input of the simplex element F‴.

In similarity with FIGURE 17, the system has control means $CO_1$ and $CO_2$. All the outputs for $CL>F$ from the elements CL′, CL″ and CL‴ are connected together and with the control element $CO_2$ for moving the system SY in the direction toward a smaller numerical value. In the same manner all the outputs from the duplex elements CL′, CL″ and CL‴ for $CL<F$ are connected together and with the control element $CO_1$ for moving the system from a higher in the direction toward a smaller numerical value.

The idea behind this logical design will appear from the following description of a mode of operation which causes the system to move from one position to the other.

Assuming that the system is in position "2" and that it is desired to move it to position "4," the simplex elements will be found in the following binary combination as a starting point:

100

Since the binary code of position "4" is

110 the duplex elements CL′, CL″ and CL‴ will be set to the binary code in some manner, for example manually. In the logic design this will cause the input from the simplex element F′ to the duplex element CL′ to give output from this element on the output for equal numerical value, because the first figure of the binary code is "1." This will cause the output from the duplex element CL′ to be applied to the input of the second simplex element F″. This, however, is in the ZERO-position and due to its series-connection with the next duplex element CL″ this will produce an output on its line for $CL>F$ and thereby signal to the control element $CO_2$ to move the system which has been found by this feeler scheme to be in a position having a smaller numerical value than the one desired by the duplex elements, to move the system from the smaller in the direction toward the higher numerical value. This causes at the first stage of the movement a change of the binary coding of the simplex elements F′₁, F′₂ and F′₃ with the element F′₂ changed to the ONE-position in position "3" of the system.

At that stage, however, the ONE-signal from F″ to CL″ is transmitted further from the output line from CL″ that the two elements have the same numerical value to the element F‴. This has the numerical value ZERO and since the last of the duplex elements in the cascade also has the ZERO-value, this will result in an output on the line for $CL=F$ from the last element CL″ with a reset signal on $CO_2$ and thereby stop of the change of condition of the system or movement thereof respectively.

Obviously, if the system was in position "4" and the binary combinations of the duplex elements were set to position "2," this would result in signal on the control element $CO_1$ for moving the system from a higher in the direction of a lower numerical value.

As obvious from this description the duplex elements can be considered as elements having elements which in the cascade connection have a sequentially occurring feed-back comparison of numerical values.

When in the start position or original position of the system and the setting of the desired position according to the binary coding of the duplex elements, the first signal is transmitted from the first simplex element to the first duplex element, the duplex element compares whether the numerical value of the first figure in the binary code is different or equal. If the first figure is different, already the first of the duplex elements has carried out the comparison and given a signal to that one of its outputs which causes change of condition of the system to the lower or higher numerical value respectively, depending upon the comparison.

If, however, as in the case described the numerical value is the same for the first simplex element and the first duplex element, this does not cause any output signal to move the system from the first element, but it refers the evaluation and decision about the direction into which the system has to be moved to the next duplex element due to the cascade coupling. When the first duplex element has found that it has the same numerical value as the first simplex element, it will produce an output on the line for equal numerical value which will be transmitted to the next simplex element which, depending on its numerical value, will produce an input to the second duplex element. If this has the same numerical value this will be referred further to the third series-connection of simplex and duplex elements, but if the second duplex element has a numerical value which differs from that of the second simplex element this will result in the desired command to the system to move to a position which corresponds to a higher or lower numerical value than that found by the comparison.

This is due to the fact that in binary combinations ZERO and ONE are shifting in such a manner that within any one of numerical values which can be expressed in decimal figures having binary combinations assigned thereto, there are not two binary combinations having ZERO and ONE in the same sequence.

Therefore, if for example in a system with 32 conditions the system is in condition 16 corresponding to the binary code

11110 and it is desired to change the condition to position 24, corresponding to the binary code

11101 the processing of the binary codings which occur in the cascade connection of the elements will result in the comparison being equal at the first three stages but being different in the fourth stage and producing a signal on the output from the duplex element regarding the direction into which the system has to be moved.

The setting of the duplex elements into the desired binary code can be effectuated manually. Each duplex element can be of the monostable type so that all of them normally are in ZERO position, whereby the manual setting can be effectuated by a "one-pushbutton" for each of the duplex elements which has to be set to the ONE-position.

The duplex elements may also be in the form of bistable elements in which event "set" and "reset" pushbuttons for each element are required.

The logic design described also provides for further combinations to provide further logic designs.

A further aspect of the invention is based on the thinking that the pushbutton which obviously can be used for setting and resetting the duplex elements represents a simplex element which is a remote control source. A plurality of simplex remote-controlled elements can therefore be used for setting the duplex elements into any desired binary combination which in the manner hereinbefore described will cause the condition of the system to be changed from an existing condition to another one as determined by the binary code of the duplex elements.

This leads the thinking of this invention into the "mirror-inverted" control as also indicated in FIGURE 18.

As obvious from the foregoing description a pushbutton system can be used for setting the binary combination of the duplex elements $CL'$, $CL''$ and $CL'''$. Such pushbuttons represent simplex elements and are in FIGURE 18 indicated by $S_1$, $S_2$ and $S_3$.

Provided, however, that a system $SY_1$ controlled in some suitable manner already is carrying out the change between the conditions desired to be carried out by the system SY, the thinking of this invention goes in the direction of providing the system $SY_1$ with a command system CF which is a counterpart of the feeler system of the system SY but which is only reverting the signals so as to be able to set the elements $S_1$, $S_2$ and $S_3$ when the system $SY_1$ has changed its condition.

As obvious from FIGURE 18 with the systems SY and $SY_1$ being identical with the same number of positions and the same binary code of the actuator members which are assigned to each of the positions, the logical design of FIGURE 17 will operate in that manner that if both systems are for example in position "2" and system $SY_1$ is moved to position "4" this would cause the elements $S_1$, $S_2$ and $S_3$ to be set corresponding to the binary code of "4," namely 110 whereby with the connection between the elements $S_1$, $S_2$ and $S_3$ and the duplex elements $CL'$, $CL''$ and $CL'''$ to set the duplex elements, they will automatically be set to the same binary code as the elements $S_1$, $S_2$ and $S_3$.

With the system SY still being in position "2" and thereby the elements $F'$, $F''$ and $F'''$ being in the binary code corresponding to position "2" this renders the comparison process carried out by the duplex elements and described hereinbefore effective with the result that output signal will occur on the line for $CL>F$ from the duplex element system and thereby provide ON-signal to the command element $CO_2$ for moving the system SY from a lower numerical value in the direction of a higher numerical value. When the system SY has been moved to position "4" the output on the line for $CL>F$ will disappear and there will be output on the line for $CL=F$ from the last duplex element in the cascade, namely $CL'''$. This line is connected with the switch-off inputs of the two command elements $CO_1$ and $CO_2$ in the same manner as described with reference to FIGURE 17 whereby the movement of the system SY is stopped.

As will be obvious from this description the logical design of FIGURE 18 provides for automatic following of the system SY with movements or changes of condition of the system $SY_1$.

The system $SY_1$ can therefore be referred to as the "master-system." Obviously, the master-system does not need to be identical with the system which follows. In the case of a simple linear movement as here described, the spacing between the positions of the system SY is only determined by the spacing between the binary-type actuator members and the control of movement from one position to another position only determined by the binary setting of the duplex elements.

On the other hand, the binary setting of the duplex elements is only controlled by the binary setting of the elements $S_1$, $S_2$ and $S_3$, and whether there is less space between the binary setting elements of the system $SY_1$ than of the system SY is immaterial, provided there is proportionality between the two systems. In other words, the master-system $SY_1$ may be a miniature system or a model from which the setting of the elements $S_1$, $S_2$ and $S_3$ is caused.

Obviously, a system which it is desired to move in more than one direction may be provided with a similar logic design for controlling the movement in the other direction, or if desired also with a similar logic design to move the system in a third direction.

This, of course, leads to the application of the logic design according to the invention to perform automatic control of a system or automatic movement of a machine following a complex configuration from a model or drawing.

The only requirement is that there must be associated with the model a sufficient number of positions to each of which a binary combination is assigned. The breakdown of the master and feeler steps, however, depends in each case on the circumstances so as to understand that the more complex the configuration is, the greater is the necessary number of breakdown steps of the binary feeling.

As obvious from the foregoing each of the positions of the master in which the binary feeler system represented by the elements $S_1$, $S_2$ and $S_3$ is rendered effective during the scanning of the master provides on the leads between the elements $S_1$, $S_2$ and $S_3$ and the duplex elements the corresponding binary code.

It is therefore possible to add to the logic design of FIGURE 18 a recorder indicated by REC, for example in the form of a tape perforator in which the tape is advanced in synchronization with the scanning steps of the master, and in which for each scanning step the binary code which is read into the elements $S_1$, $S_2$ and $S_3$ as well as into the duplex elements is automatically recorded on the tape either in the form of magnetic signals on a magnetic tape or in the form of holes on a perforated tape.

Obviously, in such event once the entire programme has been completed, it will be recorded on the tape which thereafter can be used to perform the control of one or of a plurality of machines for producing identical articles.

As will aso be appreciated from the foregoing, the system is directly applicable to perform automatic copying of an object from a master not only at reduced scale but in any proportion relatively to the master.

Obviously, the binary actuators of the systems $SY_1$ and SY effectively provide in each system a binary ruler so that with different ratio of the two rulers it is possible to obtain any desired proportionality of the movements and thereby not only to produce a fairly large article by using a small model or master, but also to produce from a standard size master or directly from tape a plurality of different sizes of the same article simultaneously on a plurality of machines only by having a binary ruler with a different scale on each of the machines.

Obviously, it is also possible to provide the binary rulers in inverted directions on two machines which enables automatic reproduction of symmetrical structures, or in a further aspect provides for simultaneous control of two machines from a master having a curved configuration so that one machine produces a concave part while the other machine simultaneously produces the corresponding convex part.

The system according to the invention as hereinbefore described can be reduced to practice in a plurality of different manners.

A simplified manner of reducing the invention to practice is illustrated in FIGURE 20 which illustrates the movement of a machine table TA. The table can be moved in the directions indicated by the arrow Ar and as control member a pneumatic or hydraulic cylinder 22 is shown.

The table is supposed to be selectively movable to 16 different positions, numbered 1–16, and of which only the positions corresponding to the even numbers are shown in FIGURE 20.

To each of the 16 positions a binary code is assigned as follows:

| Pos. No. | a | b | c | d |
|---|---|---|---|---|
| 1 | 0 | 0 | 0 | 0 |
| 2 | 1 | 0 | 0 | 0 |
| 3 | 0 | 1 | 0 | 0 |
| 4 | 1 | 1 | 0 | 0 |
| 5 | 0 | 0 | 1 | 0 |
| 6 | 1 | 0 | 1 | 0 |
| 7 | 0 | 1 | 1 | 0 |
| 8 | 1 | 1 | 1 | 0 |
| 9 | 0 | 0 | 0 | 1 |
| 10 | 1 | 0 | 0 | 1 |
| 11 | 0 | 1 | 0 | 1 |
| 12 | 1 | 1 | 0 | 1 |
| 13 | 0 | 0 | 1 | 1 |
| 14 | 1 | 0 | 1 | 1 |
| 15 | 0 | 1 | 1 | 1 |
| 16 | 1 | 1 | 1 | 1 |

For each of the binary digits, binary actuators are provided in lines referred to by $a$, $b$, $c$ and $d$ respectively. In the embodiment indicated these binary actuators are in the form of abutments adapted to actuate switches supported on a stationary member 24 above the binary ruler which is represented by the abutments.

Obviously, the switch which cooperates with the abutments in line $a$ corresponds to the element F′ of FIGURE 18, while the switch which cooperates with the abutments of line $b$ corresponds to the element F″ of FIGURE 18, etc.

In FIGURE 20 the four switches are referred to by $24_a$, $24_b$, $24_c$ and $24_d$, and as apparent from FIGURE 20 in which the table is shown in position "8," the switches $24_a$, $24_b$ and $24_c$ are actuated while the switch $24_d$ is not actuated corresponding to the binary code 1110.

In order to control the movement of the table, electrically controlled actuator members are provided associated with the cylinder 22, in the embodiment illustrated in the form of solenoid valves $26_H$ and $26_L$, the index H can be used to designate control of movement in the direction of higher or lower numerical value, respectively.

The duplex elements, the means for setting the duplex elements to the desired binary code as well as the control elements $CO_1$ and $CO_2$ of FIGURE 18 are in FIGURE 20 supposed to be included in a control panel CL which is connected with the switches on the member 24 through a cable U and with the solenoid valves through a cable CO. The connection through these cables is so that the duplex elements are connected in cascade with the switches $24_a$, $24_b$, $24_c$ and $24_d$ while the control elements $CO_1$ and $CO_2$ are connected with the solenoid valves in such a manner as to energize the solenoid valve for movement against lower numerical value from the element $CO_1$ and energize the solenoid valve for movement against higher numerical value from the element $CO_2$.

From this brief description of the schematic embodiment of FIGURE 20 and the detailed description of the mode of operation of the system as such, it is obvious that if for example the table is in position "8" and it is desired to move the table to position "12," the duplex elements of the control panel CL are set to the binary code corresponding to position "12," i.e. 1101, and in the manner hereinbefore described the comparison carried out by the duplex elements will result in signal on the output line for $CL>F$, i.e. activation of the solenoid valves $26_H$ to move the table in the direction of higher numerical value.

As obvious from the binary code shown hereinbefore this will always apply because of a 16-position system the last numerical value of the binary code of 9–16 is ONE compated with ZERO for the first numerical values "1" to "8." Therefore, the cascade configuration of the simplex and duplex elements will always result in an output on the line for higher or lower numerical value of the last of the duplex elements in the cascade connection in the case of starting position at the first or the second half, either between "1" and "8" or between "9" and "16" with a setting of the duplex elements to the desired position at the opposite half.

As obvious in the same manner from the binary code, start from any of the positions 1–4 and the desired position being between "5" and "8" will be determined by the binary numerical value "0" or "1" assigned to "1" to "4" and "5" to "8" respectively, or the reverse will be the case with respect to the binary values "0" assigned to "9" to "12" and "1" assigned to "13" and "16" with output supplied from the third of the duplex elements in the cascade.

In a similar manner outputs from the second of the duplex elements in the cascade will be effective for movement governed by the difference in binary codes in line $b$ of the binary ruler, while if the position is only desired to take place between two decimal values, the cascade connection will already "discover" which of the outputs will have to be made effective by means of the first of the duplex elements in the cascade.

Applying that philosophy which explains the behaviour of logic elements with the behaviour of human beings, the nature of the logic design according to this invention can be explained in the following manner:

Assuming that the machine table is in position "6" corresponding to the binary code 1010, and that by setting of the duplex elements it is desired to move the table to position "11" corresponding to the binary code 0101.

In the cascade comprising the series-connection of the simplex and duplex elements, the simplex elements are connected in sequence $24_b$, $24_c$, $24_d$, and $24_a$ corresponding to the reverse sequence of that in which "0" and "1" occur in the binary code.

The mode of operation which results in the comparison of numerical values can be explained in simple language by an analogy with questions and answers by considering each duplex element as putting a question back to the simplex element.

In the present instance where the first duplex element in the cascade is in position ONE while the simplex element is in position ZERO, the duplex elements ask back to the simplex element: "Are you also in ONE"? Since the simplex element is not in ONE but in ZERO, the answer is: "No, I am in ZERO." This gives an output on the line from the duplex element corresponding to $CL>F$. No signal is transmitted further to the next series-connection in the cascade, i.e. the question is interrupted and the whole system is energized to move the table from lower in the direction of higher numerical value.

If, however, the starting position of the table had been position "10" with the binary code 1001, the answer from the first series-connection would not have been "no" but: "Yes, I am" with the result that there would have been output on the line for $CL=F$. Thereby, due to the cascade coupling the question would have been referred further on to the next series-connection and also here the answer would have been "yes," because both elements in the next are in ZERO.

The question would then be referred further on to the third series-connection, and here the answer would be "no," because in line $b$ of the binary ruler there is ZERO in position "10" and ONE in position "11." In such event the command to move the table from lower to higher numerical value would be given from another point of the cascade.

In other words, the cascade is permanently conditioned for passing the "yes"-answers the whole way through but is able to give "no"-answer in response to difference between the numerical value of a simplex and a duplex element at any point of the cascade and on two different lines, depending on whether the numerical value of the duplex element is higher or lower than that of the simplex element.

Since during the movement of the table from for example position "6" to position "11" the cascade connection remains conditioned for passing the "yes"-answer, this means that in the movement the table has arrived in position "11" and the binary code of the simplex elements coincide with the binary code of the duplex elements, the "yes"-answer will be passed through the entire cascade with signal on the output for $CL=F$ from the last of the elements in the cascade. This "yes"-answer is then used to reset the memory-type element, $CO_1$ or $CO_2$, which has started the movement of the table and thereby stop the movement.

In addition to the elements already mentioned in connection with the brief description of FIGURE 20, there is in FIGURE 20 shown a brake member 32 associated with the table. The brake member is adapted to be rendered effective and ineffective by means of electrically controlled actuator member 34, for example a pneumatic or hydraulic cylinder with appertaining solenoid valves $36_o$ and $36_e$. Furthermore, a throttle control member 38 is provided for reducing the speed of this table.

As apparent from the foregoing description, the switches $24_a$, $24_b$, $24_c$ and $24_d$ effectively provide a binary reader which is able to read out any one of a plurality of positions each of which is determined by the binary code of the binary ruler represented by the abutments in the lines $a$, $b$, $c$ and $d$.

Obviously, the accuracy of each of the positions is governed by mechanical dimensions, i.e. the extension of the binary elements or abutments in the longitudinal direction of the table.

In order to increase the accuracy, the switch $24_e$ is provided in addition to the four switches which constitute the binary reader. Furthermore, in addition to the abutments which represent the binary ruler there is provided for each position a further abutment in the line $e$ adapted to actuate the switch $24_e$. These abutments are located with more accuracy with respect to the desired position. Each of these abutments may for example be in the form of a small conical pin having a point-type actuation of the switch $24_e$.

By governing the exact stop position in each of the positions of the table by means of the switch $24_e$, it is possible to obtain an accuracy of the stop in each position of "1" or even better by means of relatively simple mechanical devices.

A further possibility of obtaining exact stop positions is to provide the brake member 32 in the form of a conical pin which when activated enters a conical hole in the table. This will provide for the possibility of obtaining an accuracy of the stop positions of approximately ".03."

These accuracies will be satisfactory for a wide range of practical purposes, but it will be understood that the ZERO-accuracy for each position can be further improved by the use of more refined measuring devices such as optical devices to read a thin line with the switch $24_e$ being in the form of an electronic switch adapted to be actuated from an optical reader.

A more complex circuit of the embodiment of FIGURE 20 is shown in FIGURE 21.

The switch $24_e$ is connected in series with the cascade connection of the simplex and duplex elements.

As in the foregoing embodiments, all the outputs from the duplex elements corresponding to $CL>F$ are connected together in one line $30_H$ which is connected with the memory-type control member $CR_H$ to start movement in the direction of higher numerical value.

In a similar manner the outputs from the duplex elements for $CL<F$ are connected together with a common line $30_L$ which is connected with the other memory-type control means $CR_L$ for activating the movement from a higher in the direction of a lower numerical value.

Furthermore, the output line from the last duplex element $CL''''$ of the cascade connection of simplex and duplex elements for an equal numerical value designated by $30_E$ is connected with the reset input OUT for both of the control means $CR_H$ and $CR_L$.

As furthermore apparent from the circuit of FIGURE 21, each of the control means $CR_H$ and $CR_L$ has an extra output which is connected with a memory $ME_1$ for setting the memory to one of two alternative positions depending on whether $CR_H$ and $CR_L$ has been activated.

This means that if for example the table is in position "12" and according to setting of the duplex members $CL'$, $CL''$, $CL'''$ and $CL''''$ is desired to be moved to position "8" and a signal thereby in the manner described hereinbefore is given to activate $CR_L$, an input is provided on the OUT-input of $CR_H$ to secure that this is inoperative and vice versa.

Furthermore, a "set"-signal is given to the memory $ME_1$ and as apparent from the circuit setting of this memory into the position shown in full lines also results in setting of a second memory $ME_2$ in the position shown in full lines and vice versa.

The movements as controlled by the activated one of $CR_L$ or $CR_H$ thereafter continues until the desired position. When in the desired position signal occurs on the line for equal numerical value of the simplex and duplex elements, i.e. the line $30_e$, this causes an OUT-signal to both the members $CR_L$ and $CR_H$. Simultaneously, this conditions the circuit arrangement for correction or reversal of the movements if the table has passed the desired position, thereby that the memory $ME_2$ is reversed because as shown the line $30_e$ is connected with the top setting of the memory $ME_2$.

Supposing that the memory $ME_1$ is in the position shown in full lines and that the movement has been controlled by the member $CR_H$ and the table has passed the desired position, the switch $24e$ has again been opened, i.e. moved to the position shown in dotted lines and with the memory $ME_2$ thrown over from the position shown in full lines this now provides through the switch $24e$ a signal through the memory $ME_2$, the lower switch of the memory $ME_1$ to the IN-terminal of $CR_L$ and simultaneously to the OUT-terminal of $CR_H$.

By activating $CR_L$ the extra output simultaneously throws the memory $ME_1$ over and resets the memory $ME_2$ to the position shown in full lines to condition this memory for being activated again at the correct position.

As furthermore shown in the circuit of FIGURE 21 the throttle control member $R_s$ is connected with the line $30e$ for equal numerical value through a branch-off line $30_s$ whereby the throttle control member is rendered effective when the numerical values have become equal and will remain effective if the desired position is passed and the other one of the control members $CR_L$ or $CR_H$ for reversing the movement is rendered effective so as to cause the reversed movement to take place at reduced speed.

As apparent from the foregoing description a difference in numerical value of the simplex elements and the duplex elements will initially cause the table to be moved in the direction of the desired numerical value. This can be effected at relatively high speed because if the desired position is passed, the switch $24_e$ for exact position will be thrown over again and cause a temporary resetting of the memory $ME_2$ and simultaneously the throttle control member will be rendered effective. The throwing over of the memory $ME_2$ will through the path still provided through the memory $ME_1$, render the control member for movement in the opposite direction effective and as soon as this becomes effective, the extra output therefrom will throw the memory $ME_1$ over and simultaneously reset the memory $ME_2$ to be conditioned for further processing of the signals.

Thereby the movement in the opposite direction will take place at reduced speed and when eventually a signal again occurs on the line $30_e$ this will result in stop of the table at the desired position.

As will be obvious, the stop may after manual operation of the machine incidentally not be a position in which the switch 24ₑ is closed and in order to stop the movement in such an event a manually operable start switch S is shown included in the circuitry to initially throw the memory ME₂ over from the position shown in full lines.

In the foregoing description of the circuitry of FIGURE 21 and its mode of operation the brake member 32 and its connection with the circuitry has not been mentioned.

As shown in FIGURE 21 this connection is in the form of a control member R_b having its IN-input connected with both the output lines 30_H and 30_L so to make sure that the brake is activated to be retracted in response to any position of the table which is different from the desired one as set by the duplex element code.

The brake is provided with suitable control means such as cams operatively connected with a pair of switches K₁ and K₂ of which K₁ is normaly closed in the position shown in full lines to keep constant an OUT-signal to both of the control members CR_L and CR_H and thereby render both of them ineffective. Not until the brake has been completely retracted from its operative position to open the switch K₁ the inhibition of the control members CR_L and CR_H is rendered ineffective.

The other switch K₂ which is shown included in the circuit in dotted lines is normally closed and is opened when the brake is retracted and rendered effective and is not closed until after the movement has been completed and the brake is rendered effective again so as to provide a signal on the line y to indicate completion of the movement or to be used for further control purposes.

In the circuit of FIGURE 21 an element T is shown which is supposed to be a time element.

Obviously, when the desired position has been reached, the brake control REB should be rendered ineffective. If, however, the position has been passed and it is desired to reverse the position the brake must be rendered effective if the movement is going to be reversed. Therefore, the OUT-terminals of RS and RB are both connected with the line 30ₑ through the time element so that only in the event that the movement eventually is stopped, RS and RB are rendered effecive after a time which is governed by the time characteristics of the element T.

Obviously, there is a practical limit with respect to the accuracy obtainable by means of mechanical abutments to set the simplex members due to the necessary dimensions of such abutments in order to actuate the switches.

It is possible, however, as indicated in FIGURE 19 to divide a ruler into sections of for example 1/16″ with a binary code for each 1/16″ and use optical projections and readings and using this technique it will also be possible to obtain binary readings for substantially smaller intervals than 1/16′.

This lends itself directly to a plurality of practical applications such as for example in the wood-working industry.

A binary ruler of the type shown in FIGURE 19 can be produced by photographic processing.

In the case where it is desired to obtain finer tolerances than directly obtainable in such event, it is within the scope of the invention possible to copy the binary codes on film by using a similar technique as used for recording and re-recording sound synchronously with moving pictures.

It will be obvious that the details and combinations described hereinbefore can be varied in different ways within the scope of the invention.

Though in the foregoing the invention has been described in great detail with reference to different examples ti will be understood that the invention is not limited to the embodiments shown and described but that the logic elements and logic designs as well as control arrangements can be modified in various respects within limits which will be obvious to those skilled in logic elements and/or automatic control arrangements.

I claim:

1. An electronic switch element for use as a logic element having a pair of first switch means with control terminal means and assuming alternative opposite positions, said first switch means being operable to be shifted from a first position to a second position by one signal on one control terminal means and to be shifted back from the second to the first positon by another signal on another terminal means or by the absence of a control signal on said one terminal means, wherein the improvement comprises exterior terminals, and circuit branches extending through said elements between the exterior terminals thereof independently of said terminal means and including second switch means of the on-off type operatively connected with said first switch means and also assuming alternative opposite positions, said second switch means being controlled to respond to the alternative opposite positions of the first switch means to provide alternate through-connections for external signals by way of said circuit branches between the external terminals.

2. An element as claimed in claim 1, in which the on-off type switch means comprises a first switch means between a first pair of exterior terminals and a second switch means between a second pair of exterior terminals, and in which one of said switch means is open while the other is closed and vice versa.

3. An element as claimed in claim 1, in which said on-off type switch means comprises a first switch means means each operatively connected with a pair of exterior terminals and in which the switch means in two of said pairs is open while the switch means in two other of said pairs is closed and vice versa.

4. An element as claimed in claim 1 having in combination with a circuit including means effectively providing a flip-flop having input terminals and operable to be switched from one condition to the opposite condition and vice versa in response to application of alternative signals on said input terminals, a first means operable to be shifted between a condition allowing current to pass therethrough and a condition preventing passage of current therethrough, a second means operable to be shifted between a condition allowing current to pass therethrough and a condition preventing passage of current therethrough, means operatively connecting said first and said second means with said flip-flop means to shift said means between alternative opposite conditions, and circuit means including exterior terminals connecting said first and said second means in two passageways through said elements of which one is open and the other one is closed and vice versa.

5. An element as claimed in claim 4, in which said first and said second means are transistors having their base connected with opposite portions of the flip-flop circuit to keep one transistor open in one condition of the flip-flop while the other transistor is closed and vice versa.

6. An element as claimed in claim 4, in which said first means is in the form of a first pair of transistors between pairs of terminals providing two passageways, and the second means is in the form of two transistors between pairs of terminals providing a second pair of passageways, and in which each of said pairs of transistors is oppositely connected with said flip-flop means to keep the one of sad pairs of transistors open and the other closed in one condition of the element and vice versa.

7. A logic design including two elements as claimed in claim 1 having means connecting the on-off type switch means of said element in series through alternative passageways providing in response to input signals on the switch means of one element an output signal through the switch means of the other element in response to the same condition of both said elements representing the same numerical value and in response to said input signal an output signal from one of said passageways when the numerical value of one element is lower than the numerical value of the other and output signal from said other passageway when the numerical value of the one element is higher than the numerical value of the other.

8. A logic design as claimed in claim 7, in which one of said elements is preset with a numerical value which is indicative of a desired condition and the other element is set with a numerical value indicative of a data to thereby render said signals indicative of whether the data corresponds to the desired condition or deviates therefrom in one or the other direction.

9. A logic design as claimed in claim 8, in which said circuit has exterior terminals for each of said three signals.

10. A logic design having a circuit with an input and comprising a first binary on-off type switch means with two positions corresponding to different numerical values and connected in said circuit to provide alternative passageways from said input through said circuit in response to each of said numerical values, a second binary on-off type switch means with two positions corresponding to different numerical values, means connecting said second binary switch means with said passageways through said circuit to provide a signal through one of said passageways from said input in response to a lower numerical value of said first binary switch than of said second binary switch and a signal through the other one of said passageways in response to the higher numerical value of said first binary switch than of said second binary switch and an output from said second binary switch means for signal from said input through said circuit in response to equal numerical value of said two binary switch means.

11. A logic design as claimed in claim 10, in which each of the switches has two terminals which are rendered alternatively effective in response to the position of the switch means and are connected with said terminals together to provide the alternative passageways through the circuit and in which the opposite end of one of the switches is used as input and the other opposite end of the other switch as output for equal numerical value with terminals connected with each one of the alternative passageways to derive signals from said circuit in response to difference of numerical values of the two switch means.

12. A logic design as claimed in claim 11, in which the positions of said first switch means are indicative of data of a process and said second switch means is provided with means for setting said switch in response to desired process data.

13. A logic design as claimed in claim 10, comprising a series-connection of an element operable to provide from an input alternative passageways to each one of two outputs and which is connected in said circuit with its input as the circuit input and an element having two passageways therethrough from two inputs and each operable to be shifted between two outputs having its two inputs connected with the two outputs of said first element.

14. A logic design as claimed in claim 13, in which the outputs of said second element on which signal occurs in response to equal numerical value of said first and said second elements are connected together as one output for equal numerical value.

15. A logic design as claimed in claim 13, in which the first element is used as being indicative of a data of a process and the second element is provided with set and reset means and used as being indicative of a desired condition.

16. A control arrangement with an electrically operable action performing member shiftable between two positions, and data sensing members operable in response to each of said two positions and with a logic design as claimed in claim 11 comprising means operable in response to difference of the numerical value of the data indicating element from that of the elements set on the desired condition to render said action performance actuator member effective to perform said action and thereby shift the condition of the process, means operable in response to the operation of the data sensing members to shift the data indicating logic member to render the output for equal numerical value of said circuit effective, and means operable in response to signal for equal numerical value to render the actuator for the operation performing means ineffective.

17. A control arrangement as claimed in claim 16 comprising two memory type means operable to be shifted in response to set and reset signals and having outputs operable to be energized in response to "set"-signal, means operable to render said actuator means effective for shifting the operation performing member in one direction in response to output from one of said memories, and means operable to render the actuator means operable to shift the action performing means in the other direction in response to output from the other memory, means operable to apply said signals to each one of said memories in response to signal from said logic design for different numerical values of said two elements thereof in different directions, and means operable to apply "reset"-signal to both said memories in response to signal from said logic design corresponding to equal numerical values of said elements.

18. A control arrangement as claimed in claim 17 having a plurality of control arrangements with a plurality of actuators for action performing members and logic designs with said logic designs connected in series.

19. A control arrangement as claimed in claim 18, in which the passageways through said logic designs are duplicated with duplicated passageways through each of said elements and with a series-connection provided through one set of said passageways and the other one of each of said passageways connected with the control arrangement.

20. A logic design comprising the series connection of an on-off type logic element which is adapted to be switched between two alternative positions and which has an input and two outputs in a first one of which signal occurs in response to signal on the input in the "off"-position of said element and on the second one of which signal occurs in response to signal on the input in the "on"-position of the element connected in series with a duplex logic element having a first portion and a second portion adapted to be switched simultaneously between "off"-condition and "on"-condition and each having an input and a first output on which signal occurs in the "off"-condition in response to signal on said input and a second output on which signal occurs in the "on"-condition in response to signal on said input, each of said inputs on each of said portions of said duplex element being connected with each of said outputs of said first element and means operable to take out one signal from said duplex element in response to coincidence of the conditions of said elements, means operable to take out a second signal from said duplex elements in response to "off"-condition of said simplex elements and "on"-condition of said duplex elements, and means operable to take out a third signal from said duplex element in response to "on"-condition of said simplex element and "off"-condition of said duplex element.

21. A logic design as claimed in claim 20, comprising a series-connection of a plurality of series-connected simplex and duplex logic elements having the output of each duplex element for coincidence of the condition of the simplex and the duplex logic elements connected with the input of the simplex element of the next following pair of simplex and duplex elements in the series-connection.

22. A logic design as claimed in claim 21, in which the outputs from all of said duplex elements for signal in response to "off"-condition of the preceding simplex element with "on"-condition of the duplex element are connected together and all the outputs from said duplex elements for signal in response to "on"-condition of the preceding simplex element with "off"-condition of the duplex element are connected together.

23. A sensing device for the condition of a system having a logic design as claimed in claim 20, in which means is provided to control the on-off condition of the simplex element to coincide with means in the system which represent the condition of the system, and means is provided to operate the setting of the duplex elements at will, and means is operable to indicate coincidence of the condition of the simplex and the duplex elements as well as the difference of said condition corresponding to "off"-condition of the simplex elements and "on"-condition of the duplex elements and vice versa.

24. A sensing device for the condition of a system as claimed in claim 20, in which the actuator means for the simplex elements is in the form of means operable to express each of a plurality of conditions in a binary code and to set each of the simplex elements in the series connection according to each one of the figures of said binary code with the condition of the first simplex element of the series connection responding to the last figure of the binary code, the next simplex element to the next following figure, etc. with the last simplex element being set to a condition corresponding to the first figure of the binary code, and in which means operable at will is adapted to set the duplex elements of the series-connection in accordance with a similar binary code which represents a desired condition of the system with the first duplex element of the series-connection set in accordance with the last figure of the binary code, etc.

25. A control arrangement for a system having a feeler device as claimed in claim 24 comprising in addition to said logic design control means operable to change the condition of said system in the opposite direction and memory-type actuator means for each of said control means, the first of said memory-type actuator means being connected with the output from said series-connection of logic design for lower numerical value of said simplex element binary coding than that of said duplex element binary coding to set the first memory to be rendered effective to actuate said first control member in response to "set"-signal, the second one of said memory-type actuator means being operatively connected with the output from said duplex elements corresponding to a higher numerical value of the binary code of said simplex elements than that of said duplex elements to render said second memory effective to actuate said second control means, and means operatively connecting both said memory-type actuator means with the output from said series-connection of simplex and duplex elements for equal numerical value of the binary code of said simplex and said duplex elements to reset both said memory-type actuator means to render both said control means ineffective in response to coincidence of the numerical value of said simplex elements and the numerical value of said duplex elements.

26. An arrangement as claimed in claim 25 including third memory means of the off-on-type operatively connected with each of said first and second memory means to be set into a first position when the first memory means is rendered effective and to be set into a second position when the second memory means is rendered effective, said third memory means having two outputs being operatively connected with the opposite one of said first and second memory means than the one which has caused the setting of the memories so as to effectively condition the memory for rendering the memory which has caused its setting inoperative and the other one operative in response to occurrence of an input signal on its input.

27. An arrangement as claimed in claim 26 comprising fourth memory means operatively connected with both outputs from said first and said second memory means to be set into a state in which it is conditioned for being reset in response to bypass of the desired equality of numerical values of the simplex element combination and the duplex element combination and to be reset in response to such bypass to a condition of opposite comparative numerical values, and means operatively connecting said fourth memory means with said third memory means to reset first said third memory means to the opposite position of the one into which it has been set from the first or second memory means which was rendered effective to change the condition of the system into direction of a higher or lower numerical value after the condition of the first and second memory means has been reversed.

28. An arrangement as claimed in claim 24, in which means operable to effectuate the change of condition of the system of a numerical value different from the one corresponding to the setting of the duplex elements at reduced speed is provided after the desired position of the system has been passed, the reduced speed control means being of the on-off type memory means having an "on"-input operatively connected with the output of the series-connected logic design for equal numerical value to render the reduced speed control means effective.

29. An arrangement as claimed in claim 26, in which the system includes positioning means operable to inhibit the change of condition of the system, on-off type control means for said inhibition means, means operatively connecting said on-off-type inhibition control means with the output for numerical values of said duplex elements for different numerical value of the duplex elements and the simplex elements to render the inhibition control means effective to render the inhibition ineffective in response to a different numerical value, switch means operatively connected with said inhibition means operable to render said first and second memory means ineffective while said inhibition means is effective, and with said inhibition means operable to render said switch means included in said circuit means effective to condition anyone of the first and second memory means to be rendered effective in response to the difference of numerical value between the simplex and the duplex type elements.

References Cited
UNITED STATES PATENTS

| | | | |
|---|---|---|---|
| 3,349,229 | 10/1967 | Evans | 235—151.11 |
| 3,324,281 | 6/1967 | Morse | 235—61.6 |
| 3,307,047 | 2/1967 | Narud et al. | 307—88.5 |
| 3,303,332 | 2/1967 | Gotz | 235—151.11 |
| 3,302,181 | 1/1967 | Lee | 340—172.5 |
| 3,294,980 | 12/1966 | Whittle | 307—88.5 |
| 3,292,495 | 12/1966 | Hill et al. | 90—13.5 |
| 3,275,988 | 9/1966 | Yetter | 340—172.5 |
| 3,204,132 | 8/1965 | Benaglio et al. | 307—149 |
| 3,204,114 | 8/1965 | Bamberger et al. | 307—88.5 |
| 3,156,829 | 11/1964 | Richards | 307—88.5 |
| 3,094,609 | 6/1963 | Weiss | 235—157 |
| 3,046,413 | 7/1962 | Clapper | 307—88.5 |

PAUL J. HENON, *Primary Examiner.*

GARETH SHAW, *Assistant Examiner.*